(12) United States Patent
Forte et al.

(10) Patent No.: US 11,192,575 B2
(45) Date of Patent: Dec. 7, 2021

(54) STEERING COLUMN FOR A MOTOR VEHICLE

(71) Applicants:thyssenkrupp Presta AG, Eschen (LI); thyssenkrupp AG, Essen (DE)

(72) Inventors: Sebastian Forte, Mauren (LI); Robert Galehr, Schaanwald (LI); Daniel Kreutz, Feldkirch (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/958,220

(22) PCT Filed: Jan. 22, 2019

(86) PCT No.: PCT/EP2019/051470
§ 371 (c)(1),
(2) Date: Jun. 26, 2020

(87) PCT Pub. No.: WO2019/145281
PCT Pub. Date: Aug. 1, 2019

(65) Prior Publication Data
US 2020/0346682 A1   Nov. 5, 2020

(30) Foreign Application Priority Data
Jan. 24, 2018   (DE) ..................... 10 2018 101 528.3

(51) Int. Cl.
*B62D 5/00* (2006.01)
*B62D 1/185* (2006.01)
(Continued)

(52) U.S. Cl.
CPC ............. *B62D 5/006* (2013.01); *B62D 1/181* (2013.01); *B62D 1/185* (2013.01); *B62D 3/04* (2013.01); *B62D 5/0409* (2013.01)

(58) Field of Classification Search
CPC ...... B62D 5/006; B62D 5/0409; B62D 1/181; B62D 1/185
See application file for complete search history.

(56) References Cited

U.S. PATENT DOCUMENTS

2014/0090510 A1   4/2014  Huber
2018/0154925 A1 *  6/2018  Steinkogler ........... F16D 27/108
(Continued)

FOREIGN PATENT DOCUMENTS

CN   104125910 A  * 10/2014  .............. B62D 1/16
DE   199 02 557 A     7/2000
(Continued)

OTHER PUBLICATIONS

English Translation of International Search Report issued in PCT/EP2019/051470, dated May 9, 2019.

*Primary Examiner* — Paul N Dickson
*Assistant Examiner* — Scott F. Underwood
(74) *Attorney, Agent, or Firm* — thyssenkrupp North America, LLC

(57) ABSTRACT

A steering column for a steer-by-wire steering system include a steering shaft that is connectable to a steering wheel and is received in an inner steering column tube such that the steering shaft is rotatable about a longitudinal axis. An outer steering column tube may receive the inner tube such that the inner tube can be displaced along the longitudinal axis. The outer tube may be connectable to a vehicle chassis. The steering column may also include a feedback actuator having an electric motor that drives the steering shaft via a drive component that is connected to the steering shaft for the transmission of torque. The drive component may have a recess with a maximum inscribed diameter that
(Continued)

is greater than an external diameter of the inner tube, and the recess may be disposed on a side of the drive component that faces the inner tube.

14 Claims, 7 Drawing Sheets

(51) Int. Cl.
*B62D 3/04* (2006.01)
*B62D 5/04* (2006.01)
*B62D 1/181* (2006.01)

(56) References Cited

U.S. PATENT DOCUMENTS

| | | |
|---|---|---|
| 2018/0319419 A1 | 11/2018 | Kreutz |
| 2020/0189649 A1 | 6/2020 | Polmans |

FOREIGN PATENT DOCUMENTS

| | | | | |
|---|---|---|---|---|
| DE | 10033810 A1 | * | 1/2002 | ............. B62D 1/185 |
| DE | 10 2008 036 730 A | | 2/2010 | |
| DE | 10 2009 055 022 A | | 7/2010 | |
| DE | 10 2009 017 054 A | | 10/2010 | |
| DE | 10 2015 007 280 A | | 12/2016 | |
| DE | 10 2015 224 602 A | | 6/2017 | |
| DE | 102017008672 A1 | * | 6/2018 | ............. B62D 5/006 |
| DE | 102018101528 A1 | * | 7/2019 | ............. B62D 1/181 |
| DE | 102018209236 A1 | * | 12/2019 | ............. B62D 5/006 |
| WO | 00/43251 A | | 7/2000 | |
| WO | 2010/015565 A | | 2/2010 | |
| WO | 2010/112512 A | | 10/2010 | |
| WO | WO-2019145281 A1 | * | 8/2019 | ........... B62D 5/0409 |
| WO | WO-2019228962 A1 | * | 12/2019 | ............. B62D 1/192 |
| WO | WO-2020152188 A1 | * | 7/2020 | ............. B62D 1/185 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2019/051470, filed Jan. 22, 2019, which claims priority to German Patent Application No. DE 10 2018 101 528.3, filed Jan. 24, 2018, the entire contents of both of which are incorporated herein by reference.

FIELD

The present disclosure generally relates to steering columns, including steering columns for steer-by-wire steering systems for motor vehicles.

BACKGROUND

In the case of steer-by-wire steering systems, the position of the steered wheels is not coupled directly to the steering input means, for example a steering wheel. There is a connection between the steering wheel and the steered wheels via electric signals; this is to be understood to mean that the driver's steering request is tapped off by a steering angle sensor, and the position of the steered wheels is regulated via a steering actuator in a manner which is dependent on the driver's steering request. A mechanical connection to the wheels is not provided, with the result that no direct force feedback is transmitted to the driver after actuation of the steering wheel. A correspondingly adapted feedback is provided, however, for example in the case of parking or in the case of driving straight ahead, in the case of which feedback a steering torque which is adapted to the vehicle reaction and is different depending on the vehicle manufacturer is desired as a force feedback. In the case of driving around bends, reaction forces act as transverse forces on the steering gear, which reaction forces are simulated by a feedback actuator in the form of a torque which is opposed to the steering direction. The feedback actuator introduces the torque into a steering column. A steering column of this type is preferably adjustable, it being possible for it to be provided that the steering column can be adjusted in a motorized manner. Furthermore, it can be provided that the steering column moves into a stowed position in the case of autonomous vehicle guidance.

Laid open specification DE 199 02 557 A1 discloses a steering column with a feedback actuator, the torque being introduced into a steering shaft by means of a worm gear.

Furthermore, document DE 10 2015 007 280 A1 has disclosed a steer-by-wire steering system with a mechanical fallback level, the torque of the feedback actuator likewise being introduced into the steering shaft of the steering column by means of a worm gear. It is a great disadvantage of said solutions that the steering columns have a high installation space requirement, in order to make a great adjusting travel possible.

Thus a need exists for a steering column for a steer-by-wire steering system of a motor vehicle, which steering column has a compact construction and provides a great adjusting travel.

DETAILED DESCRIPTION

Figure 1:
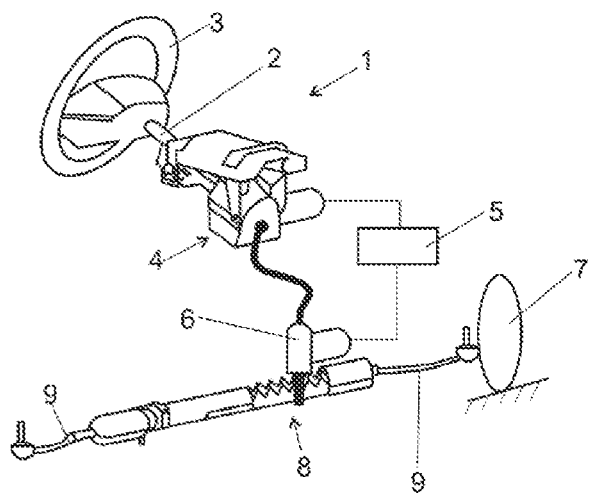
FIG. 1 is a diagrammatic view of a steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering columns for steer-by-wire steering systems for motor vehicles. In some examples, a steering column may include a steering shaft that can be connected to a steering wheel and is received in an inner steering column tube such that it can be rotated about a longitudinal axis, the inner steering column tube having an external diameter, and an outer steering column tube, in which the inner steering column tube is received such that it can be displaced along the longitudinal axis. The outer steering column tube may be connected to a chassis of the motor vehicle. The steering column may further include a feedback actuator that has an electric motor that drives the steering shaft via a drive component that is connected to the steering shaft for the transmission of a torque.

Therefore, a steering column for a steer-by-wire steering system for a motor vehicle is proposed, comprising a steering shaft which can be connected to a steering wheel and is received in an inner steering column tube such that it can be rotated about a longitudinal axis, the inner steering column tube having an external diameter, and an outer steering column tube, in which the inner steering column tube is received such that it can be displaced along the longitudinal axis, it being possible for the outer steering column tube to be connected to a chassis of the motor vehicle, the steering column comprising, furthermore, a feedback actuator which has an electric motor which drives the steering shaft via a drive component which is connected to the steering shaft for the transmission of a torque. According to the invention, the drive component has a recess with a maximum inscribed diameter which is greater than the external diameter of the inner steering column tube, the recess being formed on that side of the drive component which faces the inner steering column tube.

The maximum inscribed diameter can also be called the diameter of the plug gauge circle. In one preferred embodiment, the recess has a circular-cylindrical basic shape, that is to say in other words is configured as a circular-cylindrical opening, the maximum inscribed diameter corresponding in this case to the diameter of the circular-cylindrical basic shape, that is to say the internal diameter of the circular-cylindrical opening.

The external diameter of the inner steering column tube is also to be understood to mean the envelope circle diameter if the inner steering column tube has an outer cross section which differs from a circular cylinder. It is therefore to be noted that the teaching according to the invention is not restricted to an inner steering column tube with a circular-cylindrical outer cross section. The recess according to the invention with a maximum inscribed diameter which is greater than the external diameter of the inner steering column tube makes it possible that the inner steering column tube can be pushed at least partially into the drive component, for example in the case of an adjusting operation of the steering column, in the case of which adjusting operation the inner steering column tube is adjusted with respect to the outer steering column tube, or in the case of accident-induced telescoping of the steering column, in the case of which telescoping the inner steering column tube is pushed into the outer steering column tube. An adjusting operation can be provided, in the case of which the inner steering column tube is retracted almost completely into the outer steering column tube, said adjusting position being called a stowed position. Said position is assumed, for example, when the vehicle is not controlled by way of the vehicle driver, but rather autonomously.

The accident-induced telescoping of the steering column can take place here in such a way that an energy absorption device is provided which is arranged between the inner steering column tube and the outer steering column tube, with the result that, in the case of the inner steering column tube being pushed into the outer steering column tube, energy is absorbed in a controlled manner.

A compact construction of the steering column can be maintained thanks to the solution according to the invention, since the steering column tube can be pushed at least partially into the drive component.

It can be provided that the outer steering column tube can be connected directly or indirectly to the chassis of the motor vehicle. In order to realize an indirect connection, the steering column comprises a holding part which can be connected to the motor vehicle, the holding part carrying the outer steering column tube. The outer steering column tube and the inner steering column tube can preferably be pivoted with respect to the holding part, with the result that a height adjustment is realized.

The recess is preferably configured as a circular-cylindrical opening, said opening being particularly preferably arranged concentrically with respect to the longitudinal axis. The inner steering column tube is preferably likewise arranged concentrically with respect to the longitudinal axis.

The recess preferably has a depth, said depth preferably being at least 10 mm, particularly preferably 30 mm. It can be provided here that the depth of the recess is not greater than half the length of the inner steering column tube. The depth of the recess is to be understood to mean that dimension of the recess which specifies how far the recess extends into the drive component.

The steering shaft is preferably telescopic and has an inner shaft and an outer shaft. Here, the drive component is preferably seated on the inner shaft and is connected fixedly to the latter so as to rotate with it.

In one advantageous development, the drive component has a coupling section which is coupled fixedly to the steering shaft so as to rotate with it. It can particularly preferably be provided here that the coupling takes place by means of a positively locking connection, the coupling section having a positively locking recess which corresponds with the outer profile of the steering shaft. The coupling section can preferably be connected to the inner shaft in a non-positive, positively locking and/or integrally joined manner, for instance by way of adhesive bonding, soldering, welding or the like.

Furthermore, at least one calked portion can be made in the steering shaft, in the case of which calked portion a local plastic deformation takes place by means of a forming die, with the result that a radially projecting material bulge is produced. A plurality of calked portions are preferably arranged distributed over the circumference, which calked portions can be produced in each case by way of a forming die which is moved in the axial or radial direction against the steering shaft, for example the inner shaft. The drive component can be fixed in the axial direction on the steering shaft in a positively locking manner by way of the material bulge. By virtue of the fact that calked portions are provided on both sides in the axial direction, the drive component which is arranged in between can be fixed in the two axial directions. The calked portion can also comprise a plastic deformation of the drive component, for example of the coupling section, which plastic deformation intermeshes in a non-releasable manner with the material bulge in order to form a positively locking engagement.

In a first embodiment, the electric motor drives the steering shaft by means of a gear mechanism.

In one preferred development, an output-side gearwheel of the gear mechanism is connected fixedly to the drive component so as to rotate with it. Said coupling can take place, for example, by way of a non-positive and/or positively locking and/or integrally joined connection. As an alternative, it is conceivable and possible that the gearwheel and the drive component are configured as a single-piece integral component.

It can be provided that the gear mechanism is configured as a worm gear mechanism, the worm gear of the worm gear mechanism forming the output-side gearwheel.

It is advantageous if the gearwheel has a toothed rim which is formed from a plastic. The toothed rim has the toothing system. The toothed rim is preferably molded directly onto the drive component. For this purpose, the drive component can have recesses and/or apertures on its outer face, into which recesses and/or apertures the plastic penetrates in the case of the molding of the toothed rim, and therefore provides a fixed connection between the toothed rim and the drive component so as to rotate together.

In another embodiment, the electric motor surrounds the steering shaft concentrically. In this case, the electric motor acts directly on the steering shaft, the electric motor comprising a stator and a rotor, the rotor being coupled to the steering shaft in a torque-transmitting manner. The rotor of the electric motor is preferably connected fixedly to the drive component so as to rotate with it. The rotor is preferably connected to the outer face of the drive gear. The steering column preferably has at least one motorized adjusting mechanism which is arranged between the inner steering column tube and the outer steering column tube.

In order to adjust the inner steering column tube relative to the outer steering column tube, a motorized adjusting mechanism can be provided with a drive unit which comprises an electric actuating motor which is connected, as a rule via a gear mechanism, to a spindle drive which comprises a threaded spindle which is screwed into a spindle nut. The threaded spindle and the spindle nut can be driven rotationally by way of the drive unit counter to one another about an axis, namely the threaded spindle axis or, for short, the spindle axis, as a result of which the threaded spindle and the spindle nut can be moved in a translational manner toward one another or away from one another in the direction of the threaded spindle axis depending on the rotational direction. In one embodiment, the threaded spindle can be driven rotationally about its spindle axis by the drive unit which is connected fixedly to the inner steering column tube or outer steering column tube, and engages into the spindle nut which is attached fixedly with regard to rotation about the threaded spindle axis to the inner steering column tube or, as an alternative, to the outer steering column tube. In the direction of the spindle axis, the threaded spindle is supported on the inner steering column tube or outer steering column tube, and the spindle nut is correspondingly supported on the inner steering column tube or, as an alternative, on the outer steering column tube, with the result that a rotational drive of the threaded spindle brings about a translational adjustment of the inner steering column tube and the outer steering column tube relative to one another in the direction of the spindle axis. This embodiment is therefore also called a rotational spindle drive.

In one alternative embodiment of the adjusting mechanism, the threaded spindle is coupled to the inner steering column tube or, as an alternative, to the outer steering column tube such that it cannot be rotated with regard to rotation about its spindle axis, and the spindle nut is mounted correspondingly on the outer steering column tube or, as an alternative, on the inner steering column tube such that it can be rotated, but fixedly in the direction of the spindle axis. As in the first embodiment of the adjusting mechanism, the threaded spindle is supported on the inner steering column tube or on the outer steering column tube, and the spindle nut is correspondingly supported on the outer steering column tube or on the inner steering column tube, with the result that the threaded spindle can be displaced translationally in the direction of the spindle axis, by the spindle nut being driven rotationally about the spindle axis by the drive unit. This embodiment is also called a plunger spindle drive.

As in the case of the first alternative, a translational adjustment of the inner steering column tube and the outer steering column tube relative to one another in the direction of the spindle axis is brought about by way of the rotational drive of the threaded spindle. In the two embodiments, the spindle drive forms a motorized adjusting drive which is active between the inner steering column tube and the outer steering column tube and by way of which the inner steering column tube can be adjusted relative to the outer steering column tube for adjustment purposes, it being possible for the threaded spindle and the spindle nut to be moved relative to one another (in a rotational and translational manner) by motor.

FIG. 1 shows a steer-by-wire-steering system 1. A rotational angle sensor (not shown) is attached to a steering shaft 2, which rotational angle sensor detects the driver's steering torque which is applied by way of rotation of the steering wheel 3. Furthermore, a feedback actuator 4 is attached to the steering shaft 2, which feedback actuator 4 serves to transmit the feedback effects from the roadway to the steering wheel 3 and therefore to give feedback to the driver about the steering and driving behavior of the vehicle. The driver's steering request is transmitted via signal lines to a control unit 5 via the rotational angle of the steering shaft 2, which rotational angle is measured by the rotational angle sensor. In a manner which is dependent on the signal of the rotational angle sensor and further input variables, such as vehicle speed, yaw rate and the like, the control unit 5 actuates an electric steering actuator 6 which controls the position of the steered wheels 7. The steering actuator 6 acts on the steered wheels 7 indirectly via a rack and pinion steering mechanism 8, track rods 9 and other components.

Figure 2:
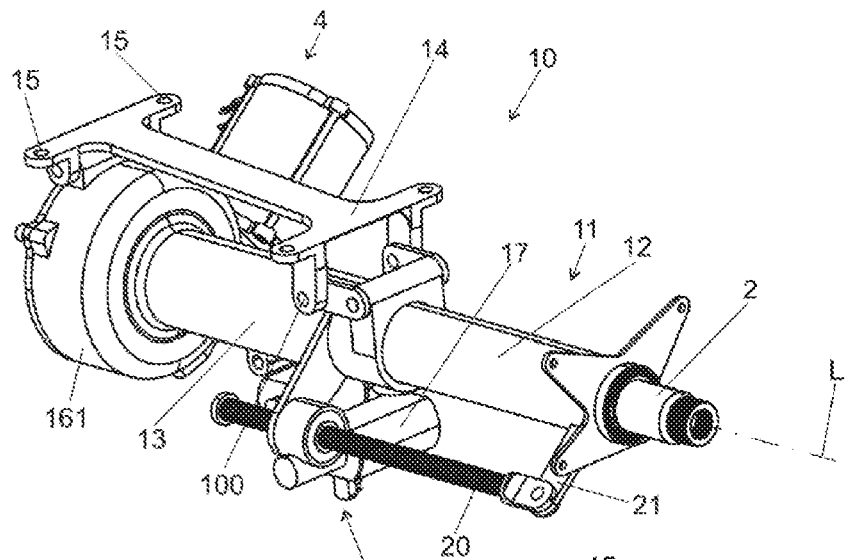
FIG. 2 is a perspective view of an example steering column for a steer-by-wire steering system.
Figure 3:
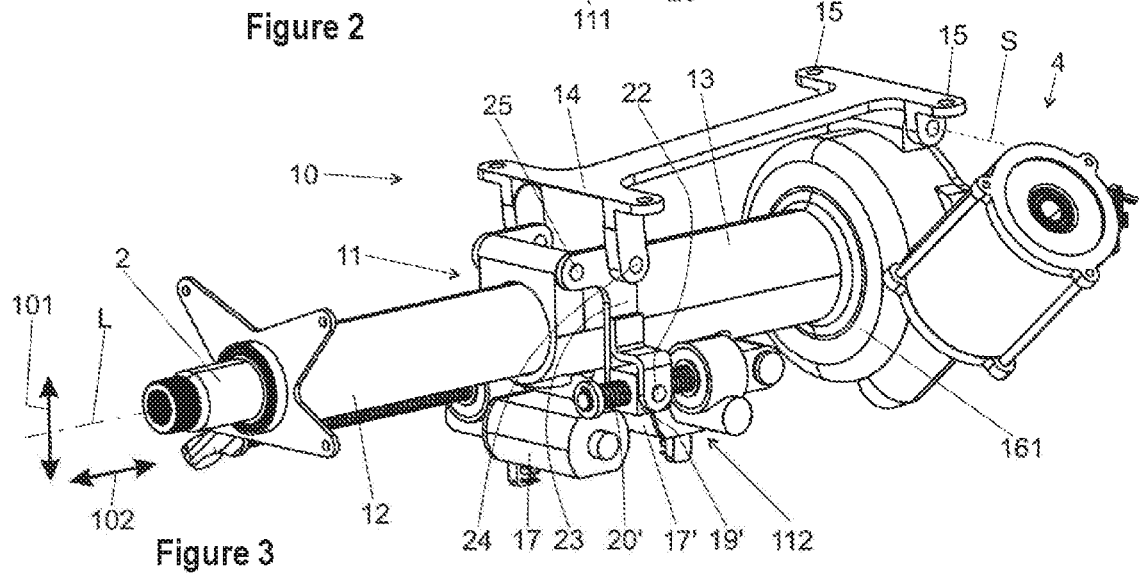
FIG. 3 is another perspective view of the example steering column from FIG. 2.
Figure 4:
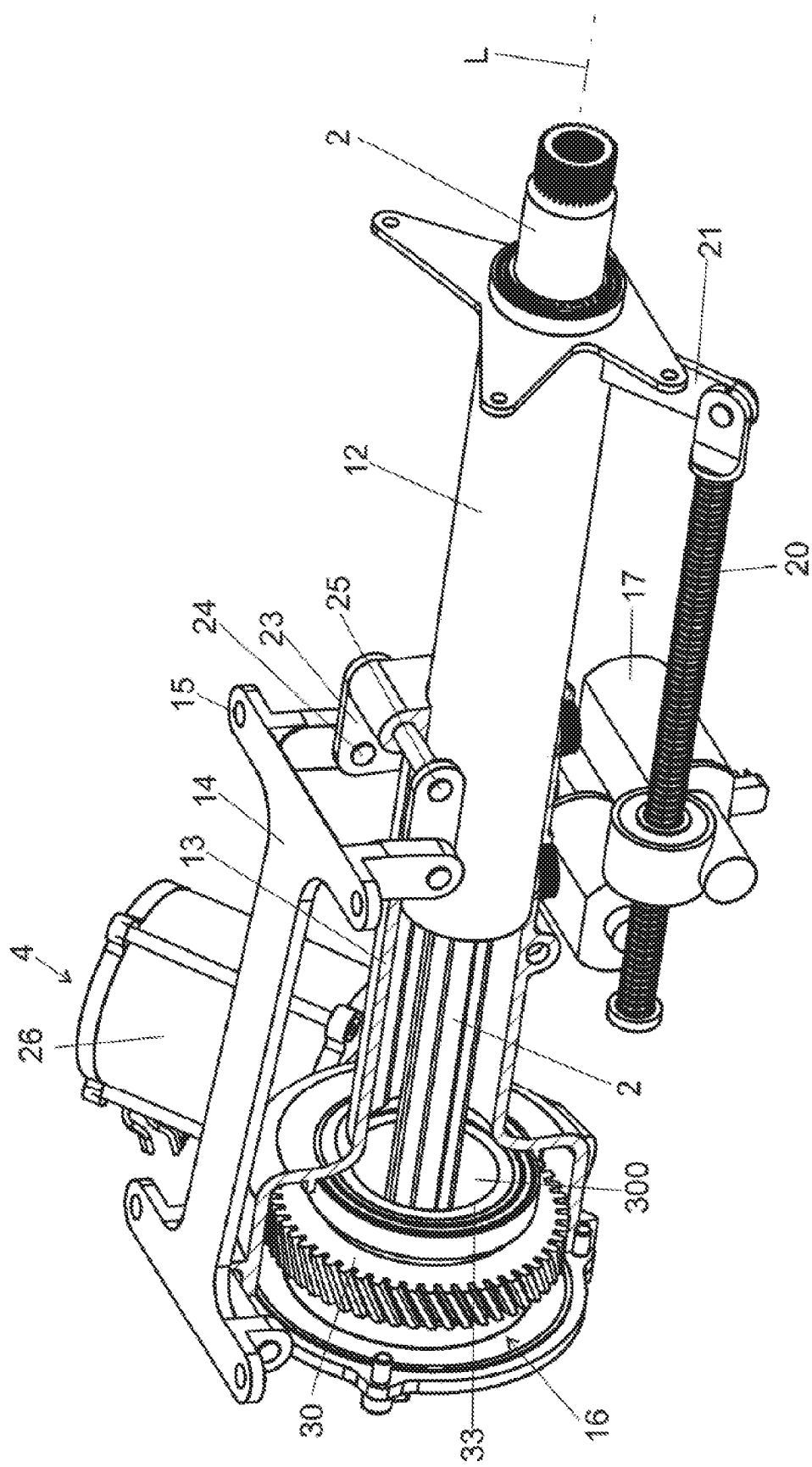
FIG. 4 is a perspective view of the steering column from FIG. 2 with a section through an example outer steering column tube.

FIGS. 2 and 3 illustrate a steering column 10 of a steer-by-wire motor vehicle steering system, having the steering shaft 2 which is mounted in a steering shaft bearing unit 11, having an inner steering column tube 12, such that it can be rotated about its longitudinal axis L which is also called a rotational axis. The inner steering column tube 12 is guided in an outer steering column tube 13 such that it can be displaced along the longitudinal axis of the steering shaft 2. The outer steering column tube 13 is held such that it can be pivoted about a pivot axis 100 in a holding part 14. The holding part 14 can be fastened at fastening points 15 to the vehicle body (not shown). The steering shaft 2 is connected to the steering wheel (not shown) at one end. The feedback actuator 4 which acts via a gear mechanism 16 on the steering shaft 2 is arranged at the other end. The outer steering column tube 13 comprises a front section 161 which is configured as a gear mechanism housing for receiving the gear mechanism 16. In order to increase the comfort of the driver, the steering column 10 can be adjusted in terms of its height in the adjusting direction 101 and in terms of its length in the adjusting direction 102. To this end, the steering column 10 has two adjusting drives 111, 112. The adjusting drives 111, 112 in each case have an electric motor 17, 17' with a threaded rod drive (also called a spindle drive) which has a worm shaft which is arranged on the output of the electric motor 17, 17', the worm shaft being in engagement with a worm gear.

FIG. 2 shows the adjusting drive 111 in the longitudinal direction 102. The threaded rod 20 is connected via a coupling lever 21 to the inner steering column tube 12, with the result that a displacement of the coupling lever 21 with respect to the outer steering column tube 13 leads to a displacement of the inner steering column tube 12 with respect to the outer steering column tube 13. The threaded rod 20 is held on the coupling lever 21 and extends in the longitudinal adjusting direction 102. The threaded rod 20 which is configured as a threaded spindle is in engagement with a spindle nut, the spindle nut being configured as a worm gear on its outer side, and the worm shaft which is arranged on the output shaft of the electric motor 17 engaging into its toothing system. The threaded rod 20 is moved axially by way of rotation of the stationery spindle nut. Said adjusting drive of the adjusting mechanism is also called a plunger spindle drive.

FIG. 3 shows the adjusting drive 112 in the height adjusting direction 101. The electric motor 17' actuates the adjusting movement of the outer steering column tube 13 with respect to the holding part 14 in the height adjusting direction 101. The threaded rod 20' is set in rotation via the rotation of the worm gear, since the threaded rod 20' is connected fixedly to the worm gear so as to rotate with it. The threaded rod 20' is in engagement with a spindle nut 19'. The spindle nut 19' is connected via a joint 22 to an actuating lever 23, the spindle nut 19' being fixed in terms of rotation with respect to the threaded rod 20'. The actuating lever 23 is held pivotably in a pivot pin 24 on the holding part 14 and in a pivot pin 25 on the outer steering column tube 13. This achieves a situation where pivoting about a pivot axis S of the outer steering column tube 13 with respect to the holding part 14 takes place via the spindle nut 19' and the threaded rod 20'. Said adjusting drive for the height adjustment is therefore configured as a rotational spindle. The adjusting drive 112 is held pivotably on the outer steering column tube 13.

Figure 5:
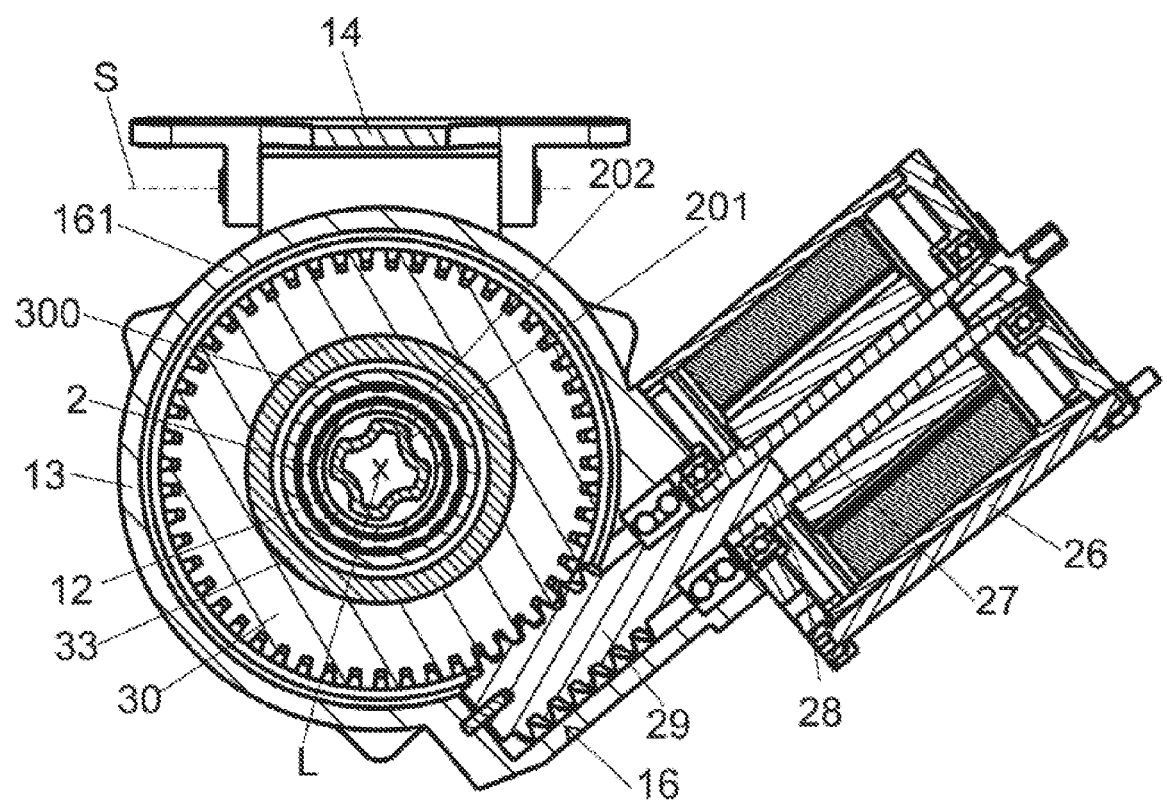
FIG. 5 is a cross-sectional view of the steering column at the height of a worm gear.
Figure 6:
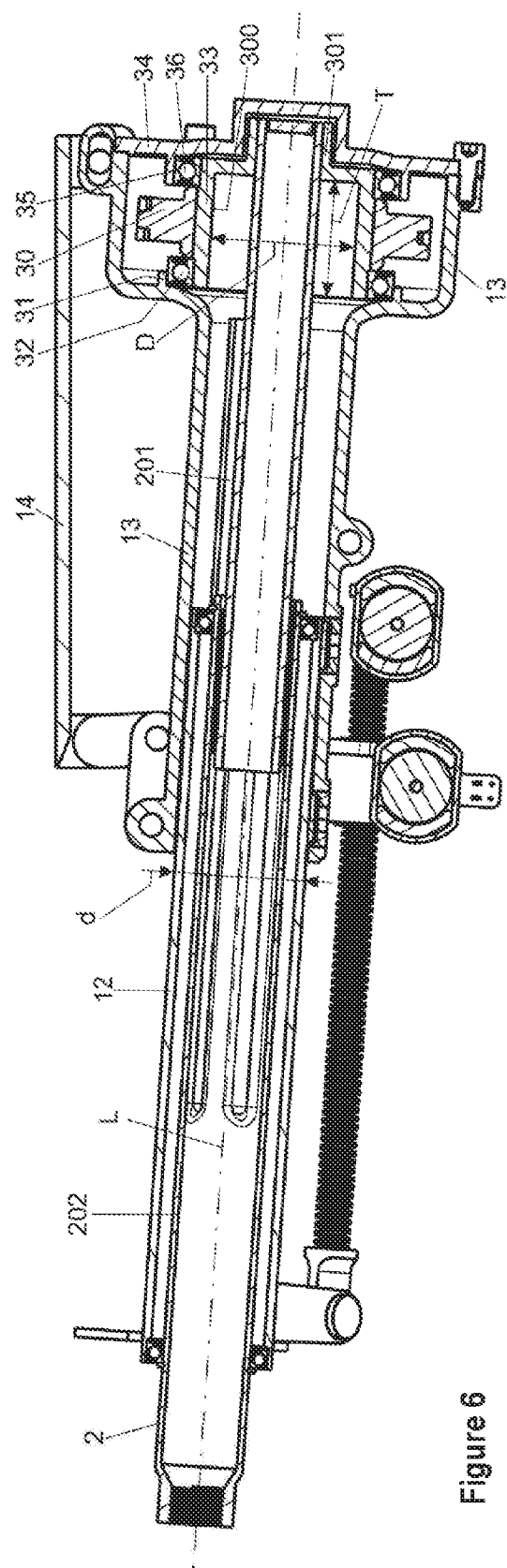
FIG. 6 is a longitudinal sectional view through the steering column in an extended position.
Figure 7:
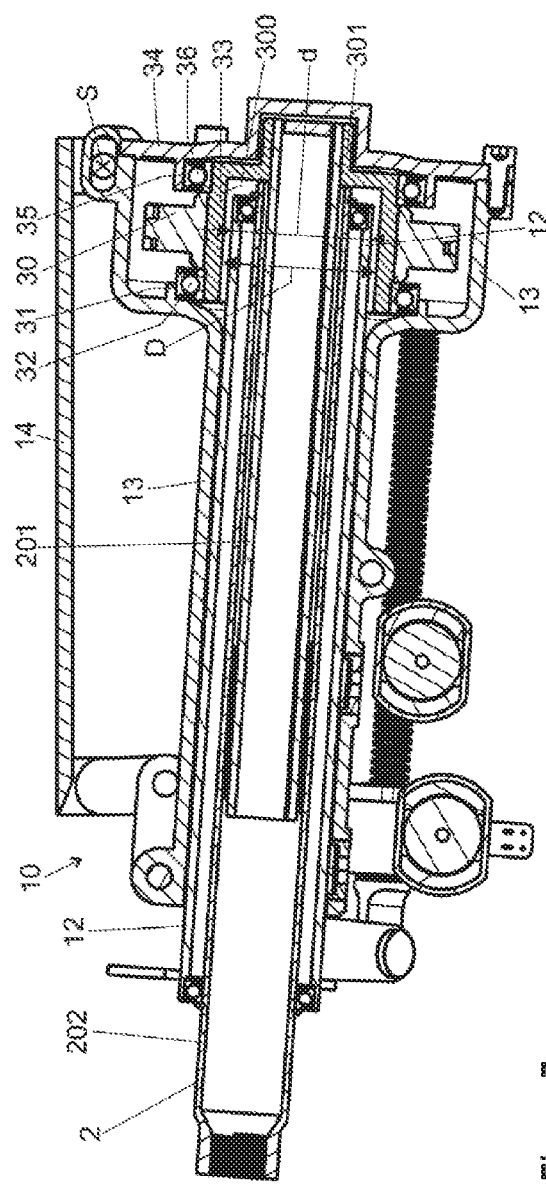
FIG. 7 is a longitudinal sectional view of the steering column in a retracted position.

FIGS. 4 to 7 show the worm gear mechanism 16 of the feedback actuator 4 in detail. An electric motor 26 of the feedback actuator 4 has a motor shaft 27 which transmits torques or rotational movements to a worm shaft 29 via a clutch 28. The worm shaft 29 meshes with a worm gear 30 which is connected to an inner shaft 201 of the steering shaft 2 for the transmission of a torque. The steering shaft 2 is telescopic and, in addition to the inner shaft 201, has an outer shaft 202 which surrounds the inner shaft 201 coaxially. Here, the profile of the outer shaft 202 is of complementary configuration with respect to a recess of the inner shaft 201, and permits a transmission of torque. At its first end, the outer steering column tube 13 surrounds the worm gear 30 on the circumferential side, and forms a seat 31 for a first anti-friction bearing 32 which is supported on a drive component 33 which rotates with the worm gear 30. The worm gear 30 surrounds the drive component 33 and is seated fixedly on the latter so as to rotate with it. The drive component 33 is in turn seated fixedly on the steering shaft 2 so as to rotate with it, with the result that a rotational movement can be transmitted from the worm gear 30 to the steering shaft 2. To this end, the drive component 33 has a coupling section 301 which is coupled in a torque-transmitting manner to the inner shaft 201. At its first end, the outer steering column tube 13 is closed by way of a cover 34 which likewise forms a seat 35 for a second anti-friction bearing 36 which is supported on the drive component 33 which rotates with the worm gear 30, so as to lie on the opposite side of the first anti-friction bearing 32. The anti-friction bearings 32, 36 mount the drive component 33 rotatably in the outer steering column tube 13. The drive component 33 is of bell-shaped configuration in its longitudinal section. The drive component 33 therefore has a first cylindrical region with a first diameter and an adjoining second cylindrical region with a second diameter, the second diameter being considerably smaller than the first diameter. In the second region, the drive component 33 is seated on the inner shaft 201 of the steering shaft 2. The drive component 33 is surrounded by the cover 34 there. In the first region, the drive component 33 has a recess 300 which is configured as an opening for receiving the inner steering column tube 12. The first diameter (also as internal diameter or maximum inscribed diameter D) is therefore selected in such a way that a clearance for receiving the inner steering column tube 12 in the retracted position of the steering column 10 results between the inner shaft 201 and the drive component 33, as shown in FIG. 7. The maximum inscribed diameter D of the recess 300 is greater than the external diameter d of the inner steering column tube 12, the recess 300 being configured on that side of the drive component 33 which faces the inner steering column tube 12. The recess extends into the interior of the drive component 300 by a depth T.

FIG. 5 shows a cross section (as viewed from the inside toward the outside) of the steering shaft 2 with the inner and outer shaft 201, 202, the inner steering column tube 12, the bell-shaped drive component 33, the worm gear 30 and the outer steering column tube 13.

FIG. 6 shows the extended position of the inner steering column tube 12. A steering wheel (not shown) can be fastened to the outer shaft 202. The outer shaft 202 is mounted rotatably in the inner steering column tube 12. The inner shaft 201 is pushed to a large extent out of the outer shaft 202. The bell-shaped drive component 33 which, by means of the recess 300, configures a clearance between the inner shaft 201 and the worm gear 30 is seated at that end of the inner shaft 201 which is remote from the outer shaft.

FIG. 7 shows the retracted position of the steering column 10, as is the case, for example, after a crash or in a stowed position. The inner steering column tube 12 and the outer shaft 202 are pushed into the outer steering column tube 13 to such an extent that the ends are pushed into the recess 300 between the inner shaft 201 and the drive component 33. Since the external diameter d of the inner steering column tube 12 is smaller than the maximum inscribed diameter D (that is to say, synonymous with the internal diameter in this embodiment) of the recess 300 of the drive component 33, the inner steering column tube 12 can be pushed at least partially (in sections) into the recess 300 of the drive component 33. In this design variant, the recess 300 is configured as a circular-cylindrical opening, the latter being arranged concentrically with respect to the longitudinal axis L. The region, in which the worm gear is otherwise seated directly on the inner shaft, can thus be utilized, as a result of which the adjusting travel becomes considerably greater without more installation space being required.

Figure 8:
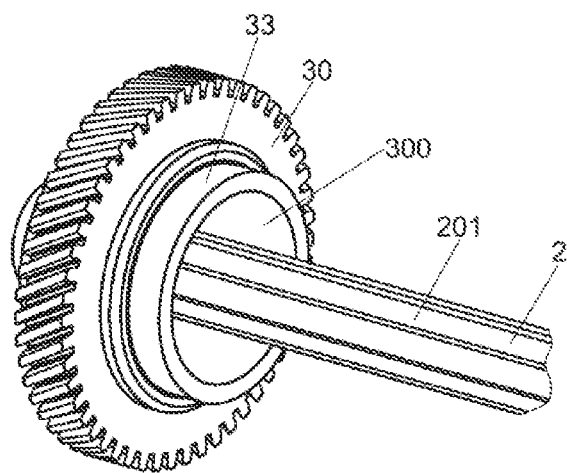
FIG. 8 is a perspective view of an example worm gear that is connected to a steering shaft.
Figure 9:
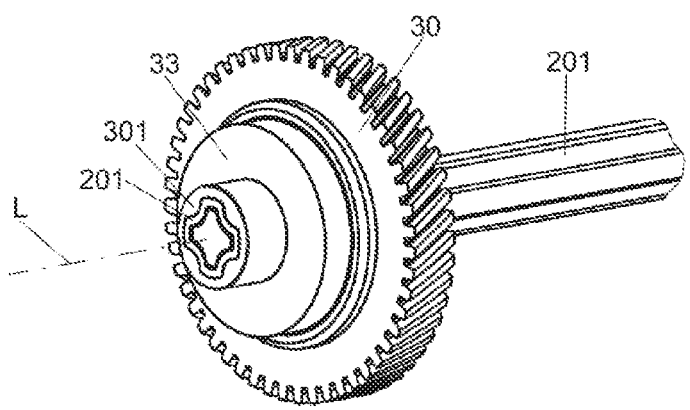
FIG. 9 is another perspective view of the example worm gear of FIG. 8.

FIGS. 8 and 9 show the seat of the worm gear 30 on the drive component 33 and the seat of the drive component 33 on the inner shaft 201 in detail. The drive component 33 has a hub in the coupling section 301, which hub is complementary with respect to the profile of the inner shaft 201 and ensures a fixed connection to the inner shaft 201 so as to rotate with it. The cloverleaf profile which is shown can be replaced by another torque-transmitting slide connection.

In the end region of the coupling section 301, calked portions 333 are made in the inner shaft 201, preferably in a manner which is distributed over the circumference. The calked portions 333 are formed plastically by way of a forming die in the radial or axial direction, in each case one radially projecting local material bulge being produced. By way of the material bulge, the coupling section 301 and therefore the drive component 33 are fixed on the inner shaft 201 in the axial direction in a positively locking manner. The calked portion 333 can also comprise a plastic deformation of the coupling section 301, with the result that a non-releasable positively locking engagement is produced. One or more calked portions 333 can preferably also be provided on the end side which faces away from the coupling section 301, with the result that the drive component 33 is held in a positively locking manner on the inner shaft 201 in the axial direction between the calked portions 333.

Instead of the worm gear mechanism which is shown, other mechanism forms can also be used, such as friction wheel mechanisms, spur gear mechanisms or belt drives. A common feature of all mechanism forms is that the output-side drive component which is provided for the connection to the inner steering shaft has a recess with a maximum inscribed diameter which is greater than the external diameter of the inner steering column tube, the recess being configured on that side of the drive component which faces the inner steering column tube.

FIGS. 10 to 14 show a second embodiment of the invention, in the case of which a rotor 260 of the feedback actuator 4 acts directly on the steering shaft 2. The electric motor 26 encloses the inner shaft 201 of the steering shaft 2 concentrically. The rotor 260 is seated on the drive component 33 and is connected to the latter fixedly so as to rotate with it. A stator 261 of the electric motor 26 is arranged on the outer side of the rotor 260. At its first front end, the outer steering column tube 13 surrounds the stator 261 of the electric motor 26 on the circumferential side, and forms the seat for the first anti-friction bearing 32 which is supported on the drive component 33 which rotates with the rotor 260. The drive component 33 has a coupling section 301 which is coupled fixedly to the inner shaft 201 of the steering shaft 2 so as to rotate with it, with the result that a rotational movement can be transmitted from the rotor 260 to the steering shaft 2. The cross section of the drive component 33 is configured as described in the first embodiment, the drive component having a recess 300 with a maximum inscribed diameter D which is greater than the external diameter d of the inner steering column tube 12, the recess 300 being configured on that side of the drive component 33 which faces the inner steering column tube 12. The recess extends into the interior of the drive component 33 by a depth T.

Figure 10:
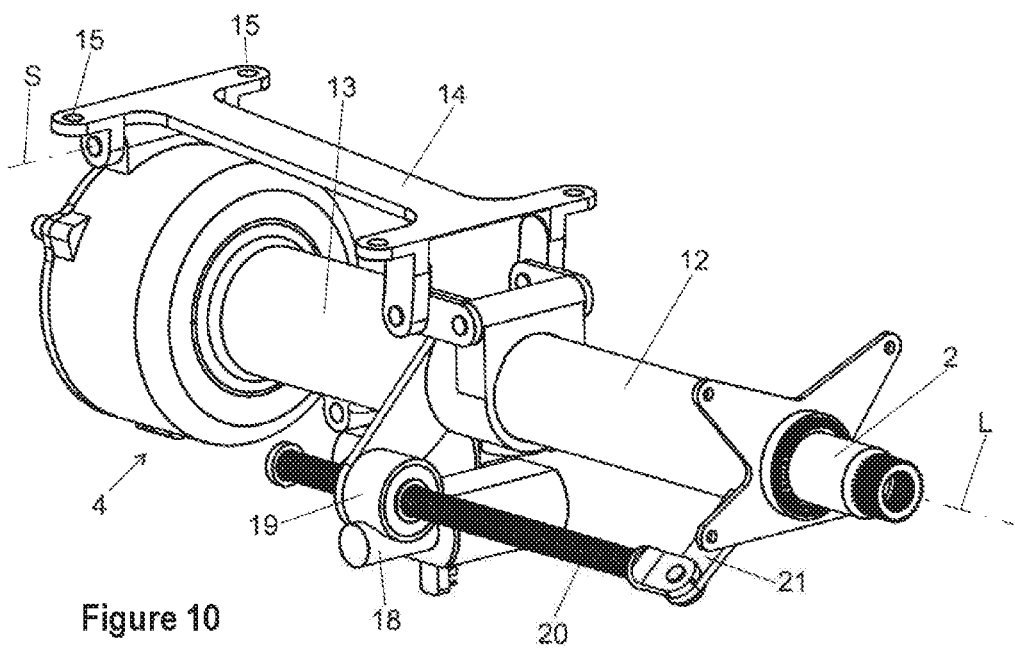
FIG. 10 is a perspective view of another example steering column for a steer-by-wire steering system with an electric motor that surrounds a steering shaft.
Figure 11:
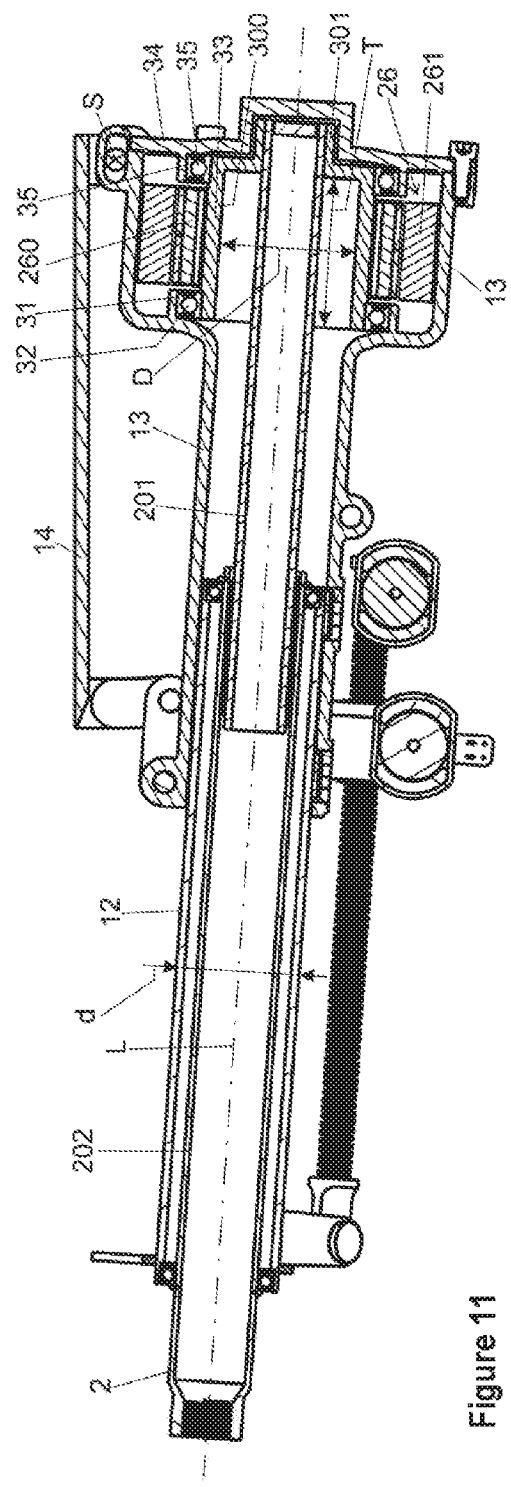
FIG. 11 is a longitudinal sectional view of the example steering column from FIG. 10 in an extended position.

FIG. 11 shows the steering column from FIG. 10 in the extended position. In the interior of the electric motor 26, the drive component 33 configures a clearance by way of the recess 300. By means of the drive component 33, the rotor 260 acts directly on the inner shaft 201 of the steering shaft 2. In this case, the term "directly" is understood to mean that there is no mechanism, and the output-side element (in this case, the rotor itself) is connected to the steering shaft.

Figure 12:
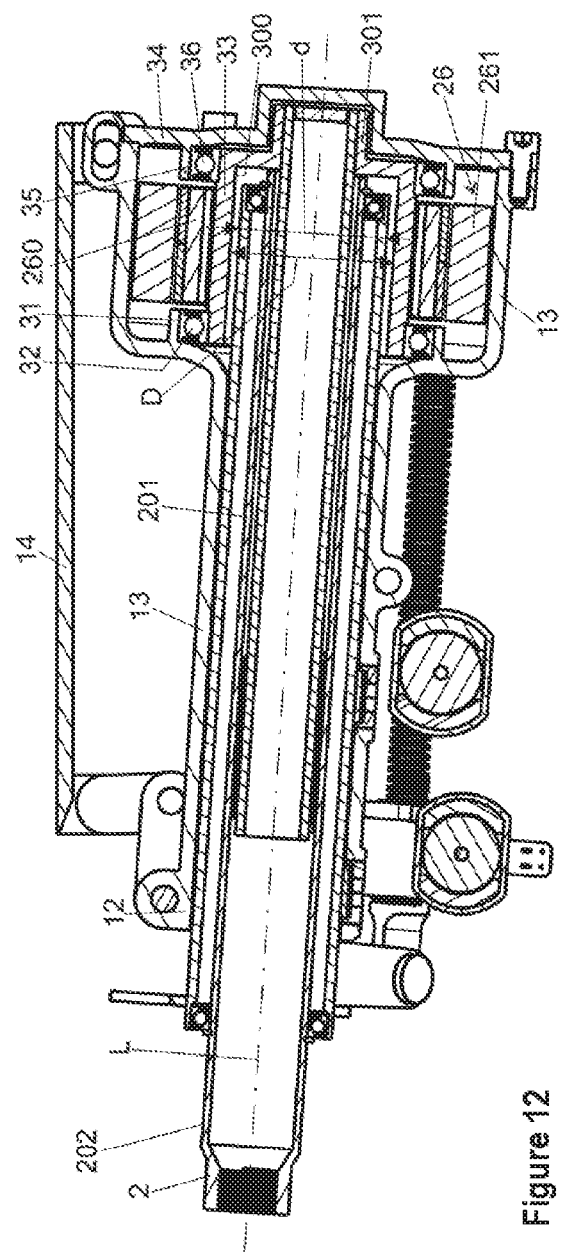
FIG. 12 is a longitudinal sectional view of the example steering column from FIG. 10 in a retracted position.

FIG. 12 shows the retracted position of the steering column from FIG. 10, as is the case, for example, after a crash or in a stowed position. The inner steering column tube 12 is pushed into the recess 300 of the drive component 33. This embodiment is particularly compact, since a mechanism is dispensed with. In addition, thanks to the arrangement according to the invention, the region of the electric motor is available as adjusting travel, stowage travel or crash travel.

Figure 13:
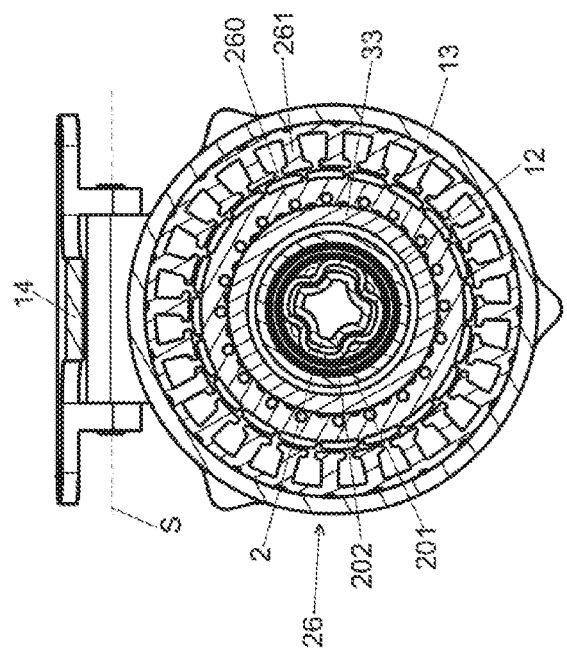
FIG. 13 is a detailed cross-sectional view of the steering column from FIG. 10 in a region of a steering shaft and a drive.

FIG. 13 shows the electric motor 26 of the second embodiment in cross section. This shows, as viewed from the inside toward the outside, the steering shaft 2 with the inner and outer shaft 201, 202, the inner steering column tube 12, the bell-shaped drive component 33, the rotor 260, the stator 261 and the outer steering column tube 13.

Figure 14:
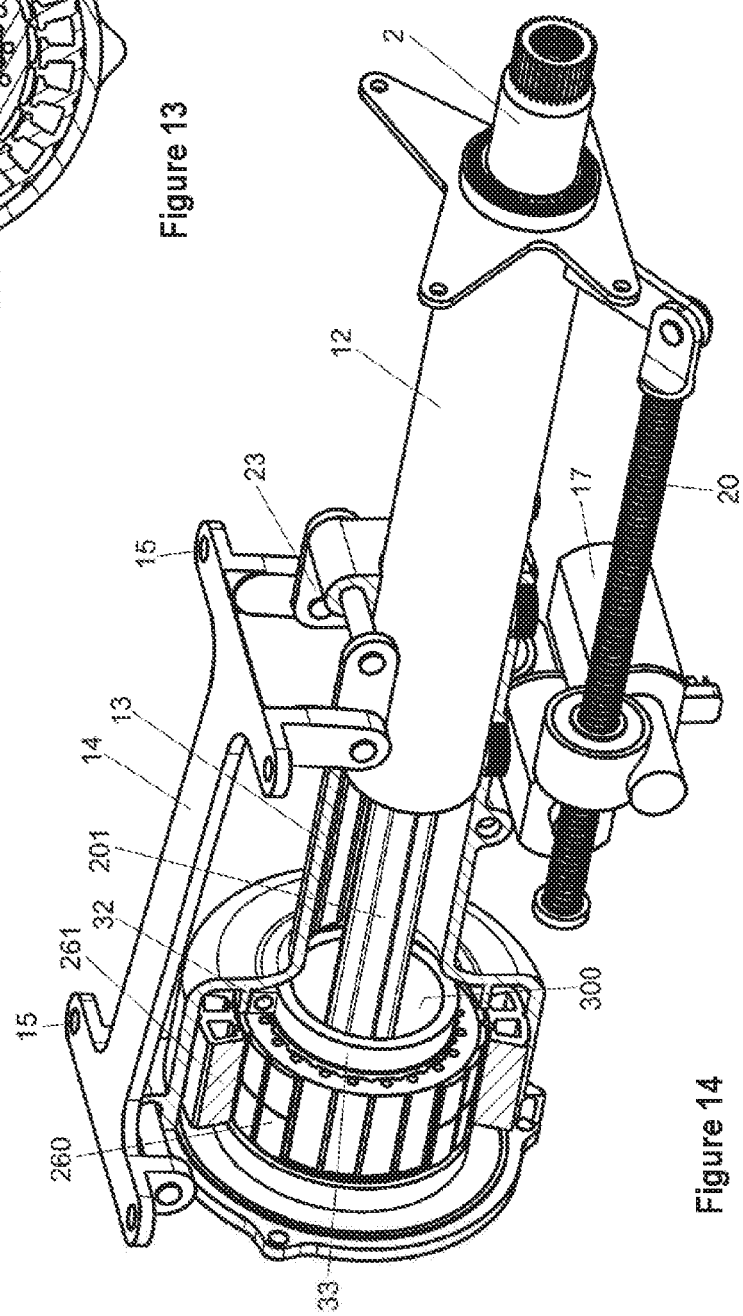
FIG. 14 is a perspective view of the steering column from FIG. 10 with a detailed sectional view in a region of a rotor of an electric motor and the steering shaft.

FIG. 14 shows a three-dimensional illustration of the arrangement of the electric motor 26 concentrically around the steering shaft 2 or the inner shaft of the steering shaft 2. The drive component 33 is mounted in the outer steering column tube 13 by means of the first anti-friction bearing 32.

Other motor designs can also be used, such as transverse flux motors.

What is claimed is:

1. A steering column for a steer-by-wire steering system for a motor vehicle, the steering column comprising:
    an inner steering column tube having an external diameter;
    a steering shaft that is connectable to a steering wheel and is received in the inner steering column tube such that the steering shaft is rotatable about a longitudinal axis;
    an outer steering column tube in which the inner steering column tube is received such that the inner steering column tube is displaceable along the longitudinal axis, the outer steering column tube being connectable to a chassis of the motor vehicle; and
    a feedback actuator with an electric motor that drives the steering shaft via a drive component that is connected to the steering shaft for transmission of torque, wherein the drive component has a recess with a maximum inscribed diameter that is greater than the external diameter of the inner steering column tube, the recess being formed on a side of the drive component that faces the inner steering column tube.

2. The steering column of claim 1 wherein the steering shaft is telescopic and includes an inner shaft and an outer shaft.

3. The steering column of claim 2 wherein the drive component includes a coupling section that is coupled fixedly to the steering shaft so as to rotate with the steering shaft.

4. The steering column of claim 1 wherein the electric motor drives the steering shaft by way of a gear mechanism.

5. The steering column of claim 4 wherein an output-side gearwheel of the gear mechanism is connected fixedly to the drive component so as to rotate with the drive component.

6. The steering column of claim 5 wherein the gear mechanism is a worm gear mechanism, wherein the output-side gearwheel is configured as a worm gear.

7. The steering column of claim 5 wherein the output-side gearwheel includes a toothed rim comprised of plastic.

8. The steering column of claim 1 wherein the electric motor surrounds the steering shaft concentrically.

9. The steering column of claim 8 wherein a rotor of the electric motor is connected fixedly to the drive component so as to rotate with the drive component.

10. The steering column of claim 1 comprising a motorized adjusting mechanism disposed between the inner steering column tube and the outer steering column tube.

11. The steering column of claim 1 wherein the recess is at least 10 mm deep as measured parallel to the longitudinal axis.

12. The steering column of claim 1 wherein a depth of the recess as measured parallel to the longitudinal axis is less than half of a length of the inner steering column tube as measured parallel to the longitudinal axis.

13. The steering column of claim 1 wherein a toothed rim is molded directly on the drive component.

14. The steering column of claim 13 wherein a radially-outer face of the drive component includes recesses and/or apertures into which plastic of the toothed rim penetrates to form a connection between the toothed rim and the drive component.

* * * * *